United States Patent [19]

Richman

[11] Patent Number: 4,916,816
[45] Date of Patent: Apr. 17, 1990

[54] RAZOR BLADE HOLDER

[76] Inventor: Scott D. Richman, 184 E. Washington Ave., Chico, Calif. 95926

[21] Appl. No.: 371,610

[22] Filed: Jun. 26, 1989

[51] Int. Cl.[4] .............................................. B26B 1/00
[52] U.S. Cl. ......................................... 30/339; 30/49
[58] Field of Search .............. 30/49, 85, 123.5, 121.5, 30/333, 334, 337, 339

[56] References Cited

U.S. PATENT DOCUMENTS

| | | | |
|---|---|---|---|
| 1,408,355 | 2/1922 | Jones | 30/49 |
| 1,634,387 | 7/1927 | Stapf | 30/334 |
| 1,666,118 | 4/1928 | Colgrove | 30/333 |
| 1,683,853 | 9/1928 | White | 30/334 |
| 1,776,247 | 9/1930 | Behrman | 30/49 |
| 1,885,444 | 11/1932 | Huber | 30/334 |
| 1,985,537 | 12/1934 | Egan | 30/334 |
| 2,017,359 | 10/1935 | Thessing | 30/334 |
| 3,169,316 | 2/1965 | Johnston | 30/335 |
| 3,257,725 | 6/1966 | Dignard | 30/290 |
| 3,465,802 | 9/1969 | Alea | 30/287 |
| 3,940,842 | 3/1976 | Perrinelle et al. | 30/278 |

Primary Examiner—Douglas D. Watts

[57] ABSTRACT

A hand held device for maintaining a double edged razor blade in a curved position. The device includes a handle member having a razor blade retaining channel at one end and a finger grip at the other. A malleable metal razor blade support protruding from below the razor blade retainer end is adapted for threading through the central apertures of a conventional double edged razor blade. The malleable metal blade support is then bent to maintain the cutting edges of the razor in a curved position.

1 Claim, 4 Drawing Sheets

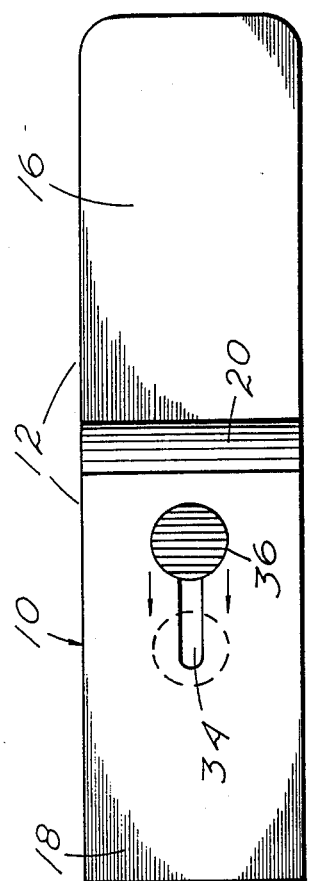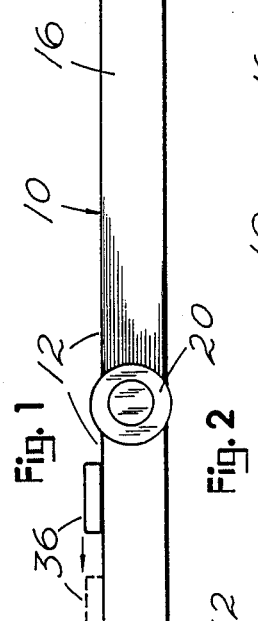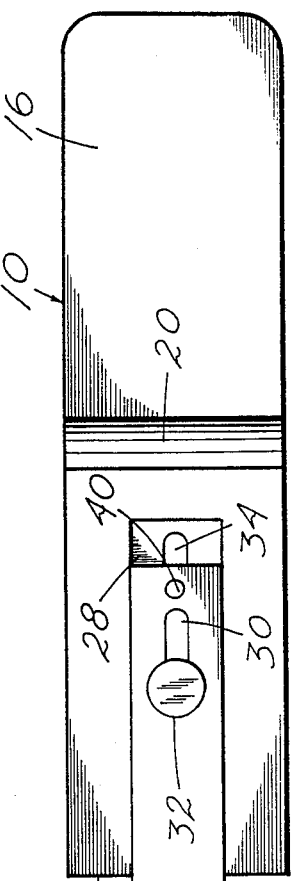

RAZOR BLADE HOLDER

BACKGROUND OF THE INVENTION

1. Field of the Invention:

This invention relates to holders for razor blades in general. More precisely the invention is a holder for a typical double edged razor blade which is capable of retaining the razor in a curved position.

2. Description of the Prior Art:

In the bakery business, it is often an accepted practice to make various cuts on the surface of the dough prior to baking so different breads can be easily identified afterwards. Razor blades have been found to be exceptionally well suited for this purpose since they make very fine cuts without accumulating excess dough on the blade edge. Several of these cuts require an acutely angled slash in the top surface of the dough which is accomplished more easily if the tip of the razor is positioned approximately at a right angle to the handle. A tip end of the razor blade must also be free and unobstructed for many of these procedures to avoid drag and accumulation of dough.

Several styles of razor blade holders have been available to the public for some time. The majority of these holders however are primarily designed for retaining the blades in a stable, straight position so the razor blade can be used for cutting, scraping or so that he blade itself can be sharpened on a leather belt or strop. None of these razor blade holders have means for retaining a razor blade in a curved position.

I therefore feel my device is a unique and novel invention structured and designed significantly different from razor blade holders disclosed in past art patents.

SUMMARY OF THE INVENTION

In practicing my invention, I have provided a handled razor blade holder with a blade support arm. The blade support arm is a round or flat strip structured of sufficiently malleable metal to allow shaping. The blade support arm can be shaped to hold a razor blade in a straight position or in a variety of selected curved positions. The handle on my device is hinged crosswise centrally to provide a small substantially rectangular finger grip section, and oppositely on the other side of the hinge, a rectangular razor blade holder section. The hinge is structured with a frictionally tight connection which requires pressure to change the relationship between the finger gripping section and blade holder section. A transverse slot along the edge of the blade holder section is sized to accept the end edge of a double edged razor blade and retain the blade by the tight frictional fit of the blade in the properly sized slot. The blade support arm is adjustable longitudinally in a slot under the blade holder sections and can be retained in position by set screws relative to the retained razor blade position. Important to the invention is the simple connective mechanics for attaching the blade to the support arm. The support arm is a substantially rectangular flat strap-like structure adapted for threading through a first aperture in the blade and out through a second blade aperture. With the edge of the blade retained in the transverse slot of the handle and the malleable support arm threaded through the blade attachment apertures, the attached razor blade is firmly retained. Materials used in the support arm structure allow the arm to be bent to produce a curve in the razor blade and to maintain that curve until the blade is removed or the support arm repositioned. Although a curved razor blade in a handle could have a variety of applications, my device is particularly useful in the bakery business for scoring bread dough. In general practice, when certain types of bread dough are formed into loaves prior to baking, shallow undercuts are made in the top surface of the dough for various reasons. It has been found that a thin razor blade is most practical for making the undercuts. Some of the undercuts are easier and faster to accomplish if the razor blade is retained in a curved position. Even slight variations in the undercuts can effect both the rising process and the final appearance of the bread loaf.

My invention increases speed in undercutting and eliminates undercut problems by providing a device which retains a razor blade in a curved position which is easy to control and produces uniform undercuts. Two embodiments of the invention are provided; one in a small adjustable finger grip hinged-handle device and the other in a simple one-piece version having a non-hinged rounded handle.

Therefore, it is a primary object of my invention to provide a razor blade holder which retains a double edged razor blade in a straight or a curved position.

Another object of my invention is to provide a razor blade holder which retains a razor blade at various adjustable angles suitable for creating assorted cuts in the surface of bread dough.

Other objects and advantages of my invention will be better understood by reference to the following detailed description and subsequent comparison with the accompanying numbered drawings.

BRIEF DESCRIPTION OF THE DRAWINGS

FIG. 1 is a top plan view of the adjustable embodiment of my razor blade holder illustrating the length adjustment of the blade support to the left and the hinged finger grip to the right.

FIG. 2 is a left side view thereof.

FIG. 3 is a bottom plan view thereof.

DESCRIPTION OF THE PREFERRED EMBODIMENTS

Figure 4:
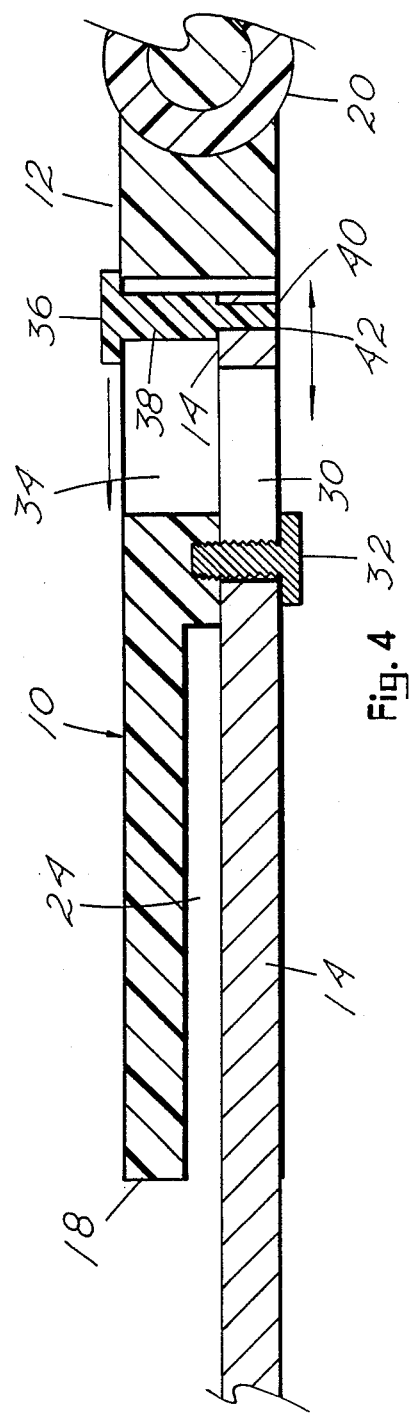
FIG. 4 is an enlarged cross sectional left side view of the adjustable embodiment, showing the retainer screw on the bottom and the adjustment knob on the top surface for the blade support. Also shown is an adjustment knob channel to the left of the adjustment knob, and the retainer screw channel to the right of retainer screw.
Figure 5:
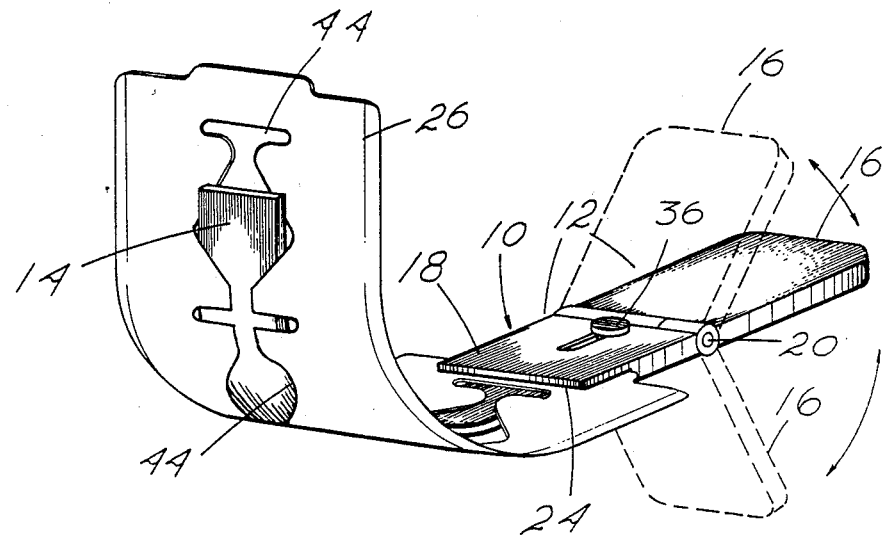
FIG. 5 illustrates a double edge razor blade retained within the adjustable embodiment of the razor blade holder showing the blade retained in a curved position and the range of variable angles which are possible with the hinged finger grip.
Figure 6:
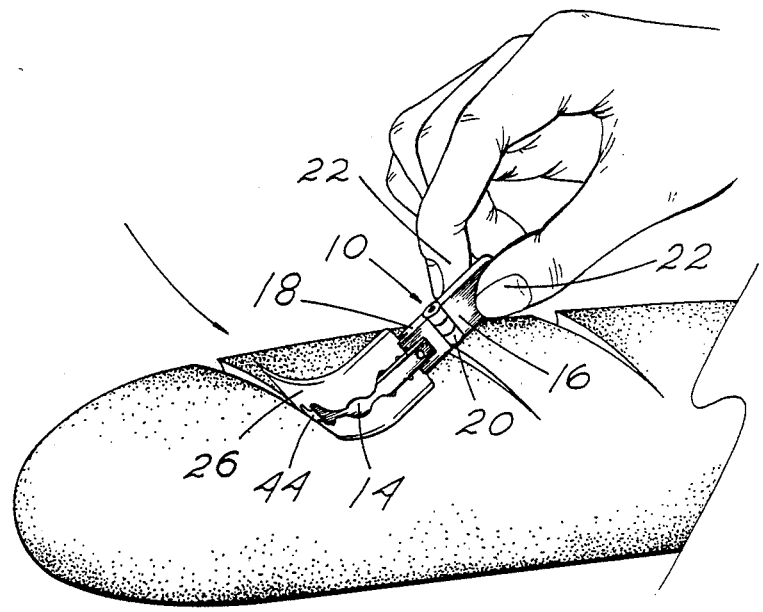
FIG. 6 is an in-use illustration showing the device used to created a series of transverse undercuts on the surface of unbaked bread dough.

The preferred embodiment of the adjustable razor blade holder 10 is illustrated in FIG. 1 through 6. Adjustable razor blade holder 10 is basically comprised of handle 12 and razor blade support arm 14. Handle 12 is substantially rectangular in shape having a top and bottom surface and two ends. Handle 12 of this particular embodiment is comprised of a hinged rear section or finger grip 16, and a front section designated razor blade attachment end 18. Finger grip 16 and razor blade attachment end 18 are centrally connected by transverse hinge 20. Finger grip 16 is sized for grasping with fingers 22, as shown in FIG. 6. Finger grip 16 of handle 12 may be sized larger for gripping with the entire hand if desired. The frontal edge of razor blade attachment end 18 contains a narrow transverse fissure, razor blade retainer groove 24. Retainer groove 24 is sized for releasably retaining one unsharpened edge of razor blade 26 by tight fitting frictional adhesion. The bottom of razor blade attachment end 18 contains an elongated rectangular central aperture, razor blade support guide 28, which extends a short distance past the end of razor blade retainer groove 24 towards hinge 20. Razor blade support guide 28 is sized for movably retaining one end of razor blade support arm 14, as shown in FIG. 3 and 4. The retained end of razor blade support arm 14 contains a longitudinal central channel 30 through which is inserted retainer screw 32, best seen in FIG. 3 and 4. Retainer screw 32 is threadably affixed in a threaded aperture in the bottom surface of razor blade support guide 28, and serves to retain razor blade support arm 14 onto handle 12. Retainer screw 32 could be a thumb screw or slotted screw requiring a screw driver to rotate. Counterclockwise rotation or loosening of retainer screw 32 loosens razor blade support arm 14 in razor blade support guide 28. Clockwise rotation tightens the head of retainer screw down onto the bottom surface of razor blade support arm 14, pressing it securely against the bottom surface of razor blade support guide 28. Tightening screw 32 may also be utilized to force the inserted end of razor blade 26 more tightly against the upper inner surface of the razor blade attachment end 18 which overhangs an inserted razor blade 26. The top surface of razor blade attachment end 18 has a central longitudinal channel, adjustment channel 34, which is positioned over and communicates with a portion of central channel 30. Central channel 30 allows longitudinal adjustment of razor blade support arm 14 within razor blade support guide 28, whereby the portion of razor blade support arm 14 extending beyond razor blade attachment end 18 can be adjusted inward and outward. Slidably retained within adjustment channel 34 is adjustment knob 36. The end of adjustment knob shaft 38, designated adjustment knob attachment stud 40, is adapted for permanent insertion into a small threaded aperture 42 located adjacent the attachment end of razor blade support arm 14. The exposed striated surface of the head of adjustment knob 36 provides traction for manually repositioning adjustment knob 36 longitudinally within adjustment channel 34. Repositioning of adjustment knob 36 after loosening retainer screw 32 is adapted to concurrently reposition razor blade support arm 14 within razor blade support guide 28.

To attach razor blade 26 onto adjustable razor blade holder 10 the end of razor blade support arm 14 is threaded through central razor blade apertures 44 of razor blade 26, and the end of razor blade 26 is inserted into razor blade retainer groove 24. Adjustable razor blade holder 10 may be made with razor blade retainer groove 24 sized to tightly accept a typical double edged razor blade 26 without having to loosen retainer screw 32, or blade holder 10 may be made with groove 24 somewhat wide and the attachment of support arm 14 into support guide 28 with retainer screw 32 structured in a manner which would require retainer screw 32 to be loosened before the insertion of a blade 26. In the later instance, retainer screw 32 would be tightened after blade 26 had been inserted into groove 24. The tightening of screw 32 would press blade 26 tightly against the underside of the razor blade attachment end 18 allowing for a more secure attachment of blades 26 even if blades 26 varied in thickness lightly from one brand of blade to another.

For slicing bread dough, the distal end of razor blade support arm 14 must extend only a very short distance through aperture 44 or it will tare the soft dough during slicing. It is best to start with the blade support arm 14 extending too far through the aperture 44 of the blade 26, then loosen retainer screw 32 and pull adjustment knob 36 toward finger grip 16 to adjust the length of blade support arm 14 extending through aperture 44. In this manner, blade 26 is not likely to escape retainer groove 24.

To curve an attached razor blade 26, razor blade support arm 14 is bent upward until the end of razor blade 26 is positioned at a desired angle. Blade support arm 14 is of sufficiently malleable metal to allow shaping and can be shaped to hold razor blade 26 in a straight position or in a variety of selected curved positions.

Figure 7:
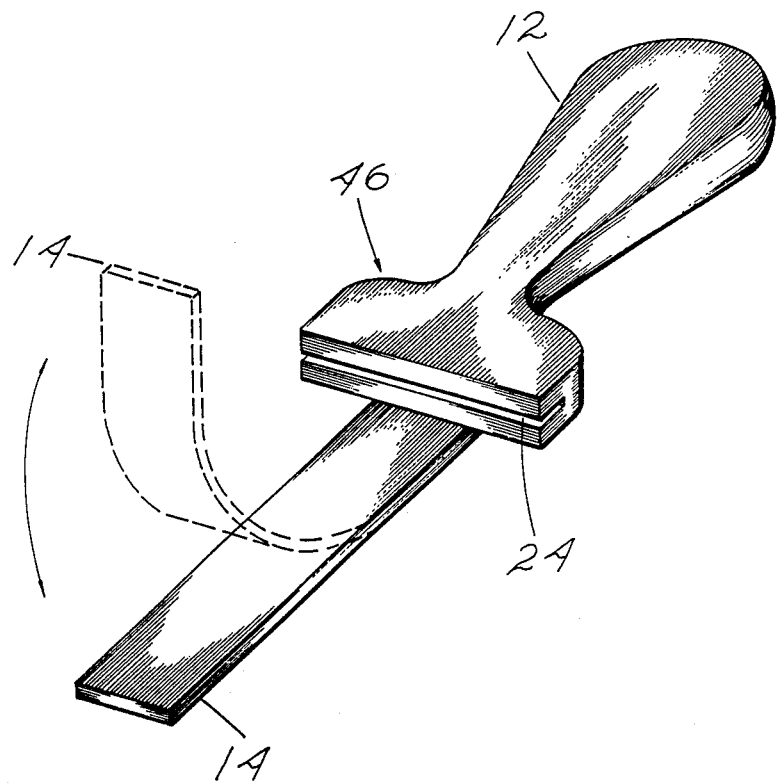
FIG. 7 is a perspective view of the simplified second embodiment of the razor blade holder.

Second embodiment 46, shown in FIG. 7, provides a simplified version of the immediate invention. Second embodiment 46 is comprised of a one piece, non-adjustable handle 12 and stationary razor blade support arm 14. The attachment end of handle 12 can be provided with or without razor blade retainer groove 24, however the use of groove 24 is preferred.

The embodiments of the present invention are particularly useful for bread making. Undercuts are made in bread dough to identify the bread and to prevent splitting of the outer crust during baking. The use of a thin razor blade has been found to be most practical for making the undercuts. The angle and depth of the undercuts can effect both the cooking and the final appearance of the bread loaf. Both embodiments of the invention are capable of creating various types of undercuts and the problems associated with the use of conventional knives are avoided.

It is intended that all drawings and descriptions of my invention shall be considered only illustrative of the principals of my device and are not intended to limit the scope of my invention.

What I claim as my invention:

1. A razor blade holder, comprising:
   a handle having a first end and a second end;
   said handle first end adapted for gripping by a human hand;
   a groove generally centrally positioned in said handle second end adapted to releasably retain one edge of a razor blade in said groove by tight fitting frictional retention;
   an elongated malleable strip of material attached to said handle second end generally adjacent said groove;
   said razor blade holder adapted for use with said razor blade being of a type having apertures therethrough with said apertures spaced longitudinally centrally in said razor blade;
   said razor blade holder adapted to hold said razor blade with said malleable strip of material threaded through said apertures in said razor blade and said one edge of said razor blade retained in said groove of said handle second end;
   said razor blade holder when holding said razor blade adapted to allow curving of said malleable strip of material whereby said held razor blade is curved;
   said malleable strip of material adapted to remain in said curved position while holding said razor blade curved.

* * * * *